United States Patent
Andrews et al.

(10) Patent No.: US 8,794,256 B2
(45) Date of Patent: Aug. 5, 2014

(54) SELF-SEALING CHECK VALVE

(75) Inventors: Lawrence J. Andrews, Cheswick, PA (US); Jeffrey D. Kerr, Claridge, PA (US); Timothy J. Botti, Irwin, PA (US)

(73) Assignee: PBM, Inc., Irwin, PA (US)

( * ) Notice: Subject to any disclaimer, the term of this patent is extended or adjusted under 35 U.S.C. 154(b) by 1382 days.

(21) Appl. No.: 12/367,912

(22) Filed: Feb. 9, 2009

(65) Prior Publication Data

US 2010/0200087 A1 Aug. 12, 2010

(51) Int. Cl.
*F16K 11/044* (2006.01)
*F16K 15/02* (2006.01)

(52) U.S. Cl.
CPC .............. *F01K 15/021* (2013.01); *F16K 11/044* (2013.01)
USPC ..................... 137/112; 137/533.19; 137/515.5

(58) Field of Classification Search
USPC ............. 137/533.19, 533.17, 543.19, 543.21, 137/515, 515.5, 533.29, 516.29, 112, 113, 137/114; 251/356, 357, 358
See application file for complete search history.

(56) References Cited

U.S. PATENT DOCUMENTS

| | | | | |
|---|---|---|---|---|
| 702,223 A * | 6/1902 | Kreher | ...................... | 137/533.17 |
| 2,018,769 A * | 10/1935 | Tryon | ........................ | 137/533.15 |
| 2,289,556 A * | 7/1942 | Stoyke | ....................... | 137/533.19 |
| 2,755,816 A * | 7/1956 | Collins | ........................ | 137/496 |
| 3,039,488 A * | 6/1962 | Bowerman | ................ | 137/516.29 |
| 3,438,393 A * | 4/1969 | Godley | ....................... | 137/533.17 |
| 3,605,793 A * | 9/1971 | Kinsel | ........................ | 137/329.06 |
| 3,702,141 A * | 11/1972 | wetterhorn | ....................... | 137/469 |
| 3,945,396 A * | 3/1976 | Hengesbach | .................. | 137/496 |
| 4,121,619 A * | 10/1978 | Pauliukonis | ................... | 137/469 |
| 4,134,417 A * | 1/1979 | Horowitz | ................... | 137/533.27 |
| 4,646,783 A * | 3/1987 | Bazan et al. | ............... | 137/533.11 |
| 4,886,085 A * | 12/1989 | Miller | ........................ | 137/533.25 |
| 4,951,708 A * | 8/1990 | Miller | ........................... | 137/526 |
| 5,183,075 A * | 2/1993 | Stein | ............................ | 137/493.6 |
| 5,794,657 A * | 8/1998 | Oberg | ........................ | 137/543.19 |
| 5,915,669 A * | 6/1999 | Zabeck et al. | ............ | 251/129.16 |
| 6,431,521 B1 * | 8/2002 | Jones | ............................. | 251/319 |
| 7,063,516 B2 * | 6/2006 | Bethel | ........................ | 137/533.15 |
| 8,485,221 B2 * | 7/2013 | O'Connor | ................. | 137/543.15 |
| 2005/0067023 A1 * | 3/2005 | Palvolgyi | ........................ | 137/538 |
| 2005/0166971 A1 * | 8/2005 | Arov et al. | ................ | 137/543.13 |

* cited by examiner

*Primary Examiner* — John Rivell
(74) *Attorney, Agent, or Firm* — James Ray & Assoc (57) ABSTRACT

A check valve includes a valve body defining an internal chamber and a valve seat disposed within the internal chamber adjacent to one of the first and second ends of the valve body. A poppet is mounted for linear movement along a poppet axis within the internal chamber between the first and second ends of the valve body and has a predetermined cross-sectional shape in a direction transverse to the poppet axis, a peripheral rim defining a movement guiding surface, a frustoconical surface provided in one axial end of the poppet and oriented in a direction toward the one end of the valve body, a sealing bead disposed on the frustoconical surface, and a predetermined plurality of passages formed in a predetermined pattern through at least one of the peripheral rim and the frustoconical surface in open communication with an opposed axial end of the poppet.

28 Claims, 5 Drawing Sheets

SELF-SEALING CHECK VALVE

FIELD OF THE INVENTION

The present invention relates, in general, to fluid flow directional valves and, more particularly, this invention relates to a poppet-type self-sealing check valve having improved sealing capability and fluid flow capacity.

BACKGROUND OF THE INVENTION

Check valves permitting free fluid flow in one direction from the supply or inlet port to the delivery or outlet port and preventing fluid flow in a reverse direction are well known in the art. Of a particular interest is a poppet check valve that includes a moving poppet member that normally uncovers the supply port when the fluid pressure at such supply port is greater than the fluid pressure at the delivery port and covers (seals) the supply port to prevent the fluid flow in the reverse direction when the fluid pressure at such supply port is less than the fluid pressure at the delivery port. The poppet check valves may be of a self-sealing type or use a bias spring or other mechanical arrangements to bias the poppet member for covering the supply port. The self-sealing check valves are generally preferred due to the decreased complexity and decreased manufacturing costs.

One of the outmost critical functional elements of such check valves is their ability to seal the supply port so as to at least substantially eliminate fluid leakage therethrough. Therefore, there is a continuing need for improved self-sealing check valves.

SUMMARY OF THE INVENTION

The invention provides a check valve. The check valve includes a valve body manufactured from a first predetermined material. The check body includes a first hollow portion having each of an outer open end defining a first open end of the valve body, an inner open end axially opposed to the outer end along a flow axis of the valve body, a first annular peripheral flange disposed on the inner end and extending outwardly transverse to the flow axis, the first annular peripheral flange having a substantially smooth surface disposed perpendicular to the flow axis, and a first annular groove formed in the substantially smooth surface. There is also a second hollow portion having each of an outer open end defining a second open end of the valve body, an inner open end axially opposed to the outer end of the second portion along the flow axis of the valve body, a second annular peripheral flange disposed on the inner end of the second portion and extending outwardly transverse to the flow axis, the second annular peripheral flange having a substantially smooth surface disposed perpendicular to the flow axis, and a second annular groove formed in the substantially smooth surface of the second portion in alignment with the first annular groove. An internal chamber is formed by the first hollow portion and the second hollow portion, the internal chamber having a round cross-section in a direction transverse to the flow axis, the internal chamber open at each of the first and second ends of the valve body. A resilient seal is provided and is at least disposed within the pair of aligned annular grooves. A clamp is also provided and abutingly engages tapered outer surfaces of the pair of peripheral annular flanges. The check valve further includes a substantially planar annular surface disposed within the internal chamber adjacent to one of the first and second ends of the valve body at a predetermined angle relative to the flow axis thereof, the annular surface having an annular chamfer encasing an inner edge thereof. There is also a disk shaped poppet that is mounted for linear movement within the internal chamber along the flow axis of the valve body between the first and second ends thereof, the disk shaped poppet having a poppet axis thereof normally aligned with the flow axis of the valve body, the disk shaped poppet manufactured from a second predetermined material distinct from the first predetermined material of the valve body. The disk shaped poppet includes a round cross-sectional shape in a direction transverse to the poppet axis, a peripheral annular rim defining a substantially smooth movement guiding surface, a cavity formed in one axial end of the disk shaped poppet, a substantially smooth frustoconical surface provided in an opposed axial end of the disk shaped poppet oriented in a direction toward the one end of the valve body, the frustoconical surface tapering from the peripheral rim in a direction toward the poppet axis, a sealing bead disposed on the frustoconical surface and having a substantially spherical surface raised a predetermined distance from the frustoconical surface abuttingly engaging the annular surface of the valve body, and a predetermined plurality of passages formed in a predetermined radial pattern through the frustoconical surface in open communication with each of the peripheral rim and the cavity, each of the predetermined plurality of passages having a generally V-shaped cross-section in the direction transverse to the poppet axis, wherein a total cross-sectional area of the predetermined plurality of passages in the direction transverse to the poppet axis is greater than a cross-sectional area of each of the first and second open ends of the valve body.

OBJECTS OF THE INVENTION

It is, therefore, one of the primary objects of the present invention to provide a poppet-type self-sealing check valve.

Another object of the present invention is to provide a poppet-type self-sealing check valve that includes an annular sealing ring disposed on the tapered surface of the poppet and having a spherical surface.

Yet another object of the present invention is to provide a self-sealing check valve that includes V-shaped fluid flow passages formed through the poppet.

A further object of the present invention is to provide a poppet-type self-sealing check valve that compensates for poppet axial misalignment during operation.

Yet a further object of the present invention is to provide poppet-type self-sealing check valve that is simple to manufacture.

An additional object of the present invention is to provide a poppet-type self-sealing check valve that has two fluid inlet ports sealed by one or two poppets.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Figure 7:
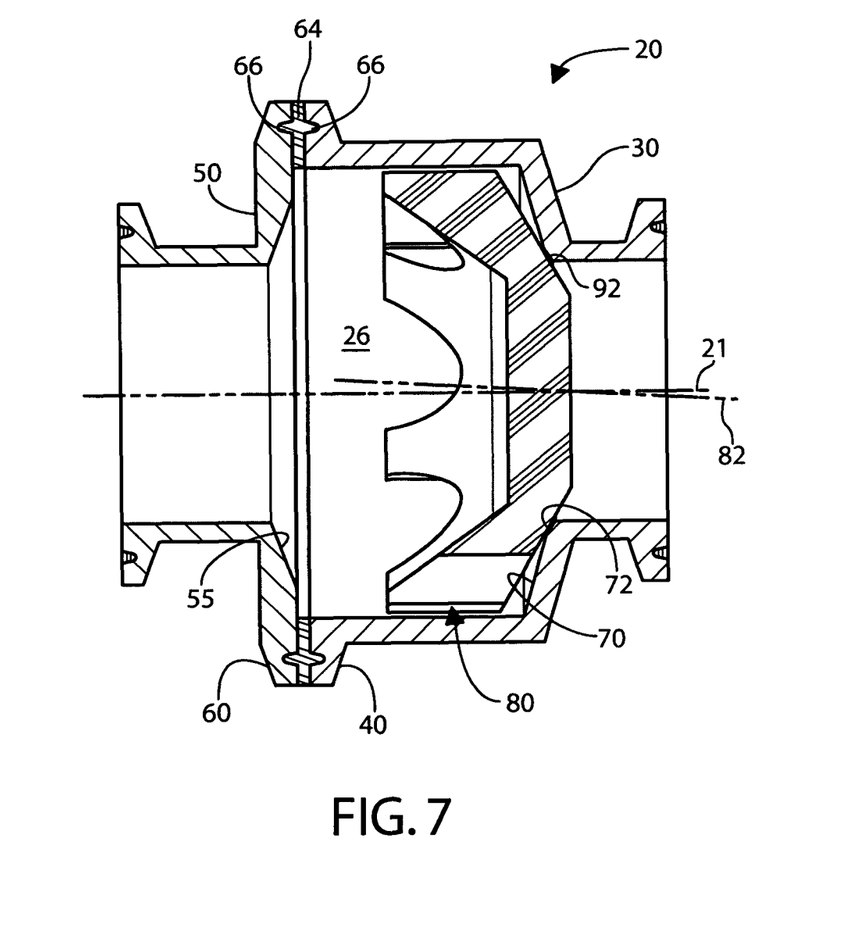
FIG. 7 is a cross-sectional elevation view of the check valve of FIG. 1, particularly illustrating a misalignment condition of the poppet member.
Figure 8:
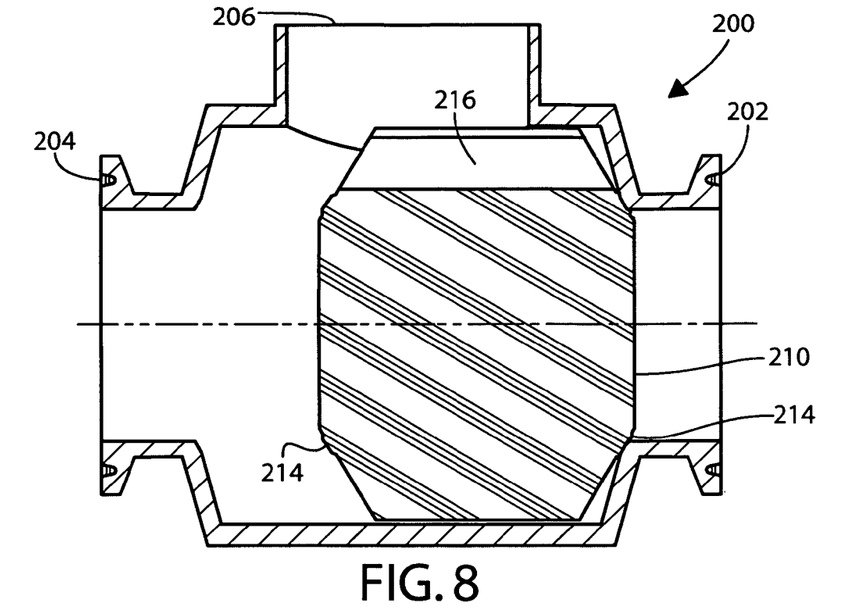
FIG. 8 illustrates a cross-sectional elevation view of a self-sealing check valve constructed in accordance with another embodiment of the invention.
Figure 9:
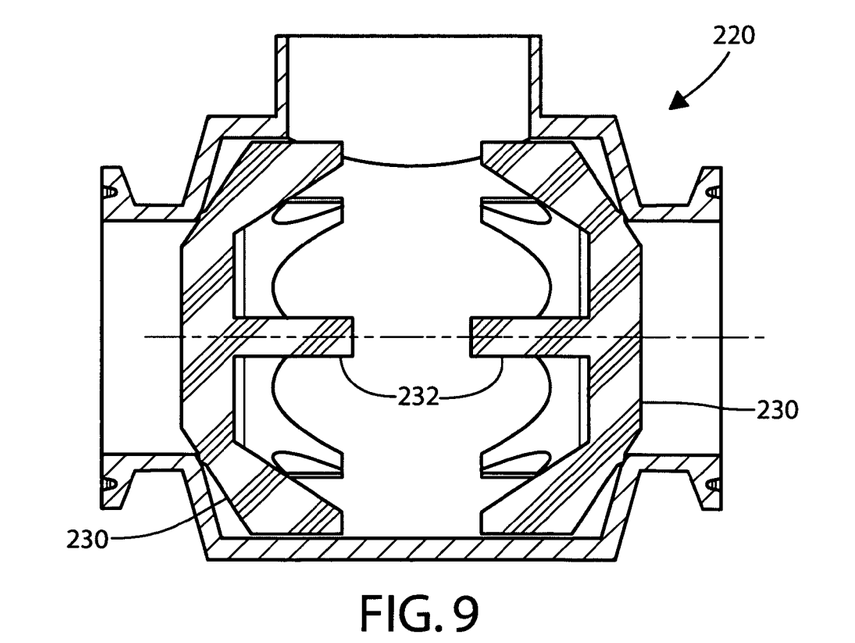
FIG. 9 illustrates a cross-sectional elevation view of a self-sealing check valve constructed in accordance with yet another embodiment of the invention.

The best mode for carrying out the invention is presented in terms of its presently preferred embodiment, herein depicted within FIGS. 1 through 7 and several alternative embodiments, herein depicted within FIGS. 8 through 9. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

Reference is now made specifically to FIGS. 1-7, wherein there is illustrated a check valve, generally designated as 10, which is constructed in accordance with one embodiment of the present invention. The check valve 10 is provided to permit the flow of fluid in one direction and prevent the flow of this fluid in a reverse direction. The fluid can be liquid, gas or air. The check valve 10 includes a valve body, generally designated as 20, which is manufactured from a first predetermined material. The valve body 20 is normally manufactured from stainless steel to accommodate broad range of applications, particularly when exposure to harmful chemicals is required.

Figures 1, 4:
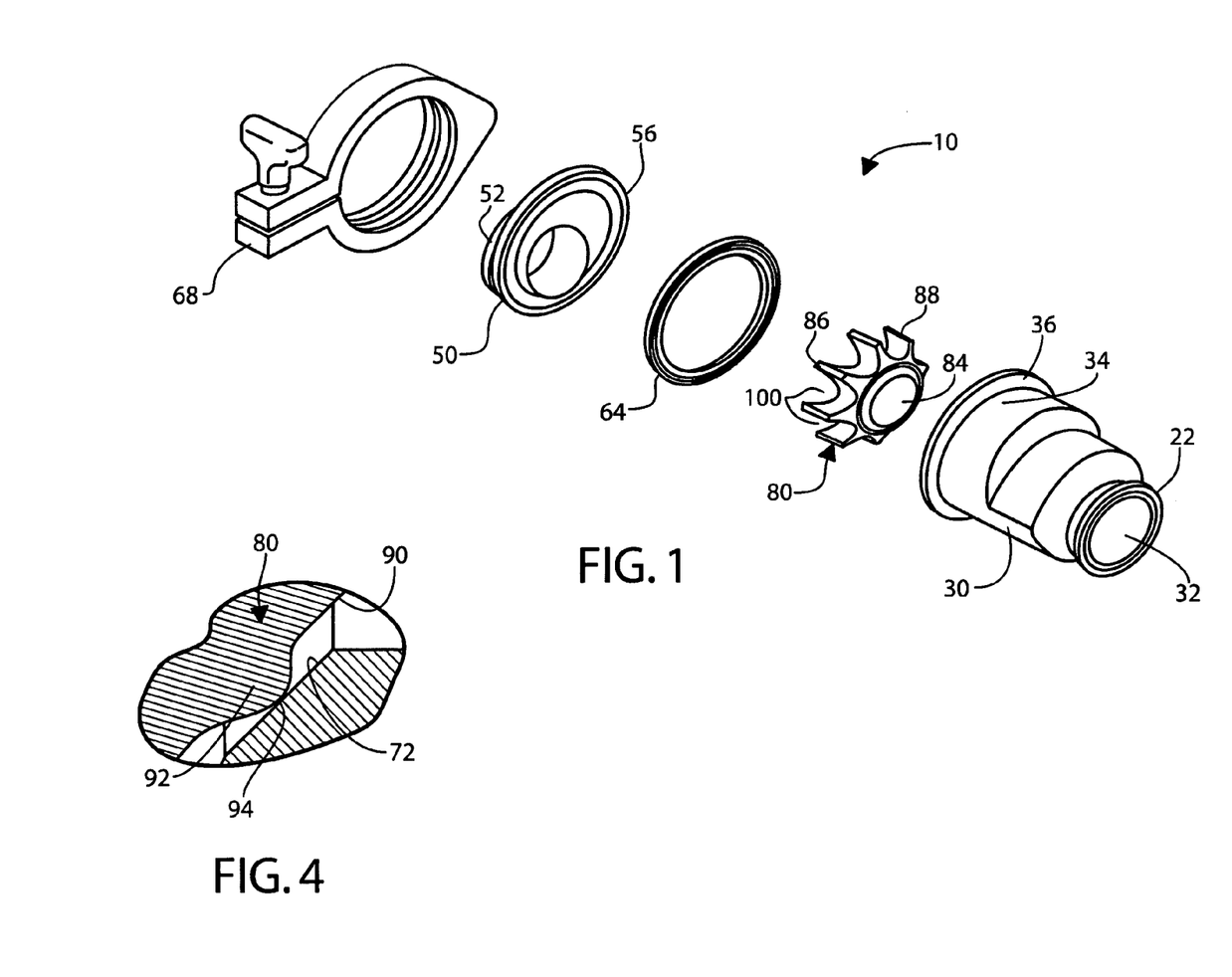
FIG. 1 illustrates an exploded isometric view of a self-sealing check valve constructed in accordance with a presently preferred embodiment of the invention.
FIG. 4 is a partial cross-sectional elevation view of the check valve of FIG. 1, particularly illustrating a sealing arrangement constructed in accordance with one embodiment of the invention.
Figure 2:
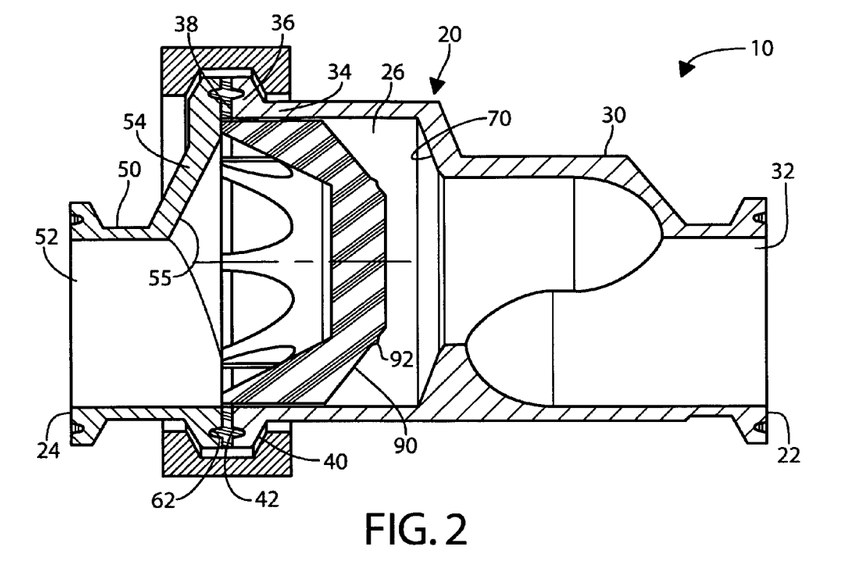
FIG. 2 is a cross-sectional elevation view of the check valve of FIG. 1, particularly illustrating a poppet member positioned to permit fluid flow through the inlet port.
Figure 3:
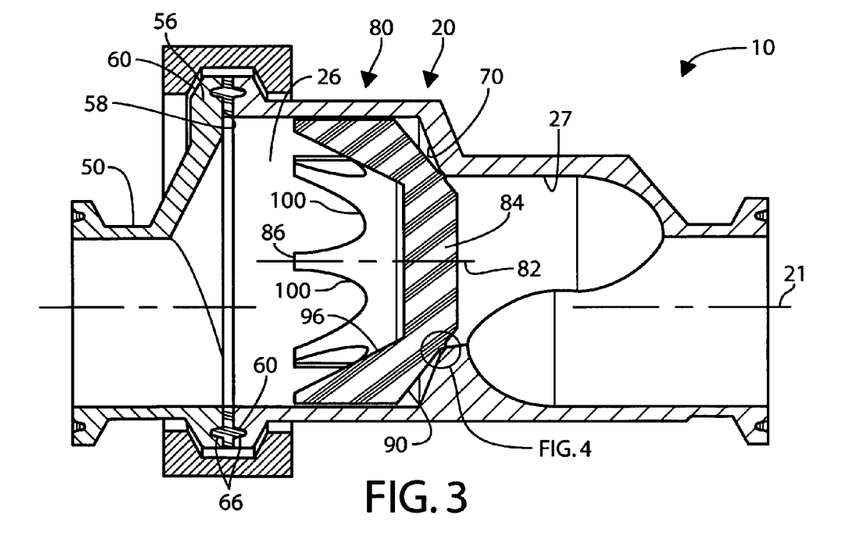
FIG. 3 is a cross-sectional elevation view of the check valve of FIG. 1, particularly illustrating a poppet member positioned to block fluid flow through the inlet port.
Figure 5:
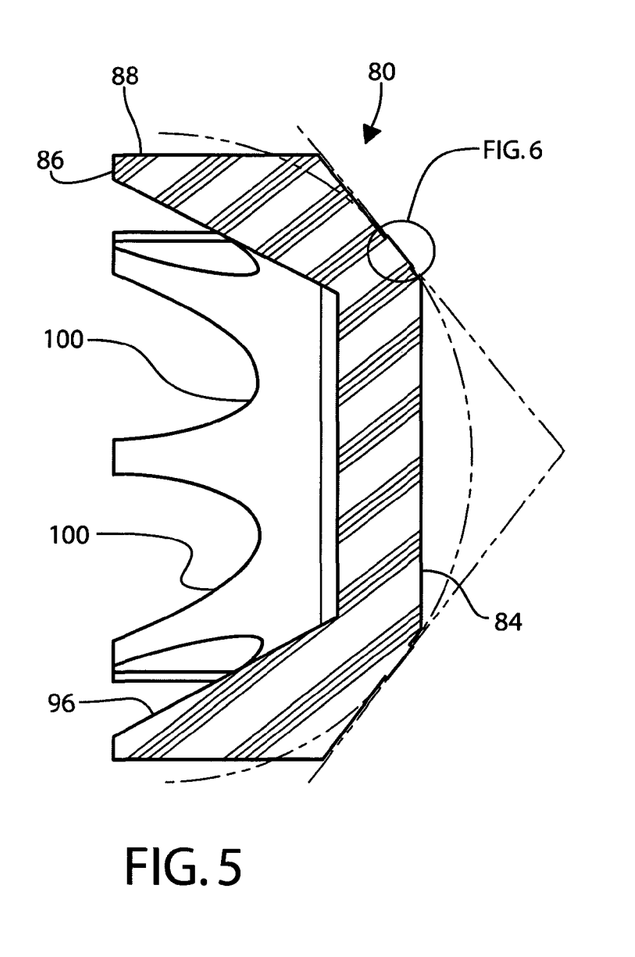
FIG. 5 is a partial cross-sectional elevation view of the check valve of FIG. 1, particularly illustrating a sealing arrangement constructed in accordance with the presently preferred embodiment of the invention.
Figure 6:
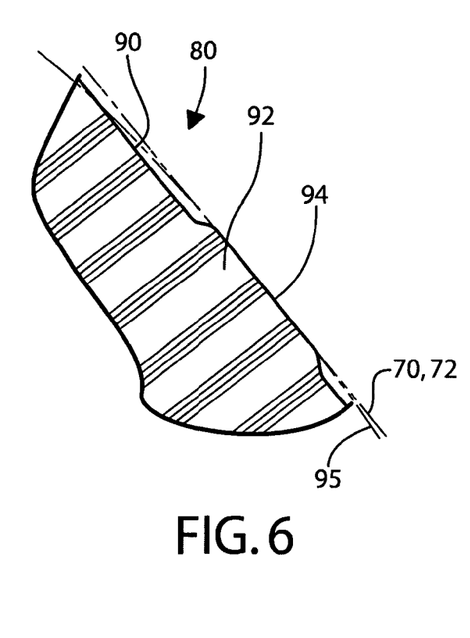
FIG. 6 illustrates an enlarged partial cross-sectional view of the sealing arrangement of FIG. 5.

The valve body 20 includes a first hollow portion 30 having each of an outer open end 32 defining a first open end 22 of the valve body 20 and an inner open end 34 axially opposed to the outer end 32 along a flow axis 21 of the valve body 20. A first peripheral flange 36, which is preferably annular, is disposed on the inner end 34 and extends outwardly transverse to the flow axis 21. The first annular peripheral flange 36 has a substantially smooth inner surface 38 disposed perpendicular to the flow axis 21 and a tapered outer surface 40. A first annular groove 42 is formed in the inner surface 38.

There is also a second hollow portion 50 having each of an outer open end 52 defining a second open end 24 of the valve body 20 and an inner open end 54 axially opposed to the outer end 52 of the second portion 50 along the flow axis 21 of the valve body 20. A second peripheral flange 56, which is also preferably annular, is disposed on the inner end 54 of the second portion 50 and extends outwardly transverse to the flow axis 21. The second annular peripheral flange 56 has a substantially smooth inner surface 58 disposed perpendicular to the flow axis 21 and a tapered outer surface 60. A second annular groove 62 is formed in the inner surface 58 of the second portion 50 in alignment with the first annular groove 42.

Thus, the valve body 20 defines an internal chamber 26 formed by the first hollow portion 30 and the second hollow portion 50. The internal chamber 26 has a round cross-section in a direction transverse to the flow axis 21 and is open at each of the first and second ends 22, 24 respectively of the valve body 20. For the sake of description, the first end 22 functions as an inlet or supply end, while the second end 24 functions as an outlet or delivery end. When required for "clean" or "sterile" applications, the shape of the internal chamber 26 is provided in localized depressions or reservoirs free manner so that the fluid cannot accumulate or otherwise be retained when the fluid from the outlet end 24 and/or inlet end 22 is to be drained or purged. Furthermore, the surface 27 of the internal chamber 26 is substantially smooth absent any cracks or crevices where fluid could be trapped or otherwise retained.

The valve body 20 also includes a resilient seal 64 having each surface thereof abuttingly engaging a respective inner surface 38, 58 and a pair of aligned raised annular abutments 66 each disposed on one surface of resilient seal 64 and sized to fit within a respective annular groove 42, 62.

The valve body 20 finally includes a clamp 68 abutingly engaging tapered outer surfaces 40, 60 of the respective peripheral annular flange 30, 50.

The present invention does not require that the first and second hollow portions, 30 and 50 respectively, are identical to each other. It is further within the scope of the present invention to provide such first and second hollow portions, 30 and 50 respectively, offset to the flow axis 21 in a direction transverse thereto, as shown in FIGS. 1-3 or concentric therewith, as best shown in FIG. 7.

The present invention also contemplates that the clamp 68 may be replaced by any well known arrangement capable of securing first and second hollow portions, 30 and 50 respectively, to each other.

The check valve 10 further includes a substantially planar annular surface 70 disposed within the internal chamber 26 adjacent to the first end 22 of the valve body 20 and at a predetermined angle relative to the flow axis 21 of the valve body 20. Thus, the annular surface 70 is essentially a frusto-conical surface. The annular surface 70 may have an annular chamfer 72 encasing an inner edge thereof.

The check valve 10 finally includes a poppet, generally designated as 80, mounted for linear movement within the internal chamber 26 between the first and second ends, 22 and 24 respectively, of the valve body 20. The poppet 80 has a poppet axis 82 thereof normally aligned, either coaxially or parallel, with the flow axis 21 of the valve body 20 and defines a pair of axially opposed ends, 84 and 86. Preferably, the poppet 80 is a disk having a round cross-sectional shape in a direction transverse to the poppet axis 82. Preferably, the poppet 80 is manufactured from a second predetermined material distinct from the first predetermined material of the valve body 20. Generally, the poppet 80 is manufactured form a polymer material, for example such as polytetrafluoroethylene (PTFE) that can be machined from bar stock, or such as a fluoropolymer that can be injection molded. It is, however, within the scope of the present invention to manufacture the poppet 80 and the valve body 20 from substantially identical materials.

The poppet 80 includes a peripheral annular rim 88 defining a substantially smooth movement guiding surface sized to accommodate thermal expansion of the poppet 80 during operation of the check valve 10.

A substantially smooth frustoconical surface 90 is provided in the axial end 84 of the disk shaped poppet 80 oriented in a direction toward the end 22 of the valve body 20. The frustoconical surface 90 tapers from the peripheral rim 88 in a direction toward the poppet axis 82.

A sealing bead 92 is disposed on the frustoconical surface 90. The sealing bead 92 is preferably formed as an annular ring. The surface 94 of the sealing bead 92, which abuttingly engages the annular surface 70 and/or its annular chamfer 72, may have any well known shapes.

By way of an example of FIG. 4, such surface 94 has a semi-circular cross-sectional shape in a direction radial to the poppet axis 82 providing essentially a circular line contact with the annular surface 70 and/or its annular chamfer 72 that generates a fairly high unit load sufficient to provide for an extremely reliable and leak-free seal. In the most preferred embodiment of the invention, the surface 94 is provided as a substantially spherical surface 94 (illustrated for the sake of clarity with the arc 95) raised relative to the substantially smooth frustoconical surface 90 so as to facilitate closing of the first end 22 of the valve body 20 to outward fluid flow when the poppet axis 82 is misaligned with the valve body axis 21, as best shown in FIG. 7

It has also been found that providing a cavity 96 in the opposed axial end 86 of the poppet 80 essentially increases the surface area of the second axial end 86 thus increasing the pressure formed by the fluid attempting to flow in a reverse direction, outwardly from the first end 22 of the valve body 20, and further enhancing sealing capabilities of the valve 10.

The poppet 80 also includes a predetermined plurality of passages 100 formed in a predetermined radial pattern through the frustoconical surface 90 in open communication with the peripheral rim 88 and in open communication with the opposed axial end 86 of the poppet 80 for permitting fluid flow through the poppet 80 in a direction from the first end 22 to the second end 24. It will be understood that when the poppet 80 includes the cavity 96, the passages 100 will be formed in open communication therewith. Each of the predetermined plurality of passages 100 has a generally V-shaped cross-section in the direction transverse to the poppet axis 82. The total cross-sectional area of the passages 100 depends on the flow capacity permitted through the poppet 80 relative to the first end 22 and/or second end 24 of the valve body 20. It is presently preferred to size the cross-sectional area of each passage 100 so that the total area of all passages 100 in the direction transverse to the poppet axis 82 is greater than a cross-sectional area of each of the first and second open ends, 22 and 24 respectively, of the valve body 20. Thus, a normally open check valve 10 (poppet 80 is moved toward the outlet end 24 enabling flow through the inlet end 22), provides a flow capacity substantially greater than that of the inlet or outlet ends, 22 or 24 respectively. The second end 86 of the poppet 80 then abuts either the wall 55 of the inner end 54 of the second portion 50 or the inner surface 58 of the flange 56, as best shown in FIG. 2.

It would be appreciated that the check valve 10 is a self-sealing configuration, which, other than the actual flow and pressure of the fluid passing through the check valve 10, requires no spring bias or other means of mechanical actuation to move the poppet 80 towards the "closed" position for sealing the inlet end 22 of the valve body 20. The check valve 10 has been designed for high capacity application by providing a substantially greater cross-sectional flow area through the poppet 80 than that of the orifice of the end 22 it is intended to isolate. This, in turn, results in a low restriction design which minimizes losses in downstream capacity and/or pressure. The check valve 10 of the present invention is suitable for both vertical and horizontal fluid flow applications. Finally, the internal chamber 26 of the valve body 20 has been designed such that the horizontal mounting arrangement is suitable for "clean" or "sterile" applications, wherein the internal chamber 26 has no localized depressions or reservoirs where fluid can accumulate or otherwise be retained when the fluid from the outlet end 24 and/or inlet end 22 has been drained or purged. Furthermore, the surface 27 of the internal chamber 26 is substantially smooth absent any cracks or crevices where fluid could be trapped or otherwise retained.

Reference is now made, to FIG. 8, wherein there is shown a check valve, generally designated as 200, constructed in accordance with another embodiment of the invention. The check valve 200 is shown as a two-way check valve, wherein the ends 202 and 204 are provided as fluid flow inlet ends and the end 206 is provided as a fluid flow outlet ends.

The poppet 210 is provided with a pair of frustoconical surfaces 212, each disposed at a respective axial end thereof, each carrying a sealing bead 214 thereon. The sealing bead 214 is substantially identical to the above described sealing bead 92. The passages 216, which are identical to the above described passages 100 extend the entire length of the poppet 210. The poppet 210 of FIG. 8 is capable of selectively sealing either the inlet end 202 or the end 204.

In yet another embodiment of the invention, shown in FIG. 9, the check valve 220 is also shown as a two-way check valve but using a pair of poppets 230 mounted in a mirror image relationship to each other. Each poppet 230 is constructed substantially identical to the above described poppet 80 except that at least one poppet 230 carries an axial stop 232 on an inner end thereof to maintain a fixed distance between the poppets 230 preventing them to intermesh with each other during operation of the check valve 220. The check valve 220 provides for substantially simultaneous sealing of the inlet ends to the return fluid flow.

Although the present invention has been shown in terms of the its use as a self-sealing check valve, it will be apparent to those skilled in the art, that the present invention may be applied to other check valves and valves using a spring bias or any other mechanical arrangement to seal at least one port.

By way of an example only, a check valve taught in U.S. Pat. No. 3,099,999 issued to Vismara may be improved with the sealing bead 92 of the present invention.

Furthermore, other self-sealing check valve may be improved by the sealing bead 92 and/or passages 100 of the present invention. By way of an example only, a check valve taught in U.S. Pat. No. 6,823,893 issued to Hebmuller may be converted into the high capacity check valve by replacing apertures 22 with passages 100 of the present invention as well as being improved with the sealing bead 92.

Teachings of U.S. Pat. No. 3,099,999 and U.S. Pat. No. 6,823,893 are incorporated into this document by reference thereto.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A check valve comprising:
    (a) a valve body having each of an internal chamber, a first aperture formed through a first end of said valve body, and a second aperture formed through an axially opposite second end of said valve body;
    (b) an annular valve seat disposed at a juncture of said internal chamber with one of said first and second ends of said valve body; and
    (c) a poppet mounted for a linear movement along a poppet axis within said internal chamber between said first and second ends of said valve body, said poppet including:
        (i) a predetermined cross-sectional shape in a direction transverse to said poppet axis,
        (ii) a peripheral rim defining a movement guiding surface,
        (iii) a frustoconical surface provided in one axial end of said poppet and oriented in a direction toward one end of said valve body, said frustoconical surface tapering from said peripheral rim in a direction toward said poppet axis,
        (iv) an annular sealing bead disposed on said frustoconical surface, said annular sealing bead having an exterior surface thereof raised a distance from said frustoconical surface, said exterior surface having a convex shape in a plane having said poppet axis disposed therewithin, said convex shape being defined by an arc disposed tangent to said annular valve seat and having a radii originating on said poppet axis, and
        (v) a predetermined plurality of passages formed in a predetermined pattern through at least one of said peripheral rim and said frustoconical surface in open communication with an opposed axial end of said poppet.

2. The check valve, according to claim 1, wherein said valve body includes a first portion carrying said one end of said valve body on an outer end thereof, a second portion carrying an axially opposed second end of said valve body on an outer end thereof and means for abuttingly attaching an inner end of said first portion to an inner end of said second portion in a substantially sealed manner.

3. The check valve, according to claim 2, wherein said sealing means includes a pair of peripheral flanges, each of said pair of peripheral flanges disposed on a respective inner end of said first and second portions and extending outwardly transverse to a flow axis of said valve body, a pair of grooves, each of said pair of grooves formed in an inner surface of a respective peripheral flange in alignment with one another, a resilient seal disposed within said pair of aligned grooves and a clamp abutingly engaging outer surfaces of said pair of peripheral flanges.

4. The check valve, according to claim 3, wherein said outer surface of each peripheral flange is tapered in a direction toward said inner surface thereof.

5. The check valve, according to claim 1, wherein said valve seat is defined by a surface of said internal chamber inclined at an angle relative to a flow axis of said valve body.

6. The check valve, according to claim 5, wherein said valve seat surface is substantially planar.

7. The check valve, according to claim 5, wherein said valve seat surface further includes a taper encasing an inner edge thereof.

8. The check valve, according to claim 1, wherein said predetermined cross-sectional shape of said peripheral rim of said poppet in said direction transverse to said poppet axis is round.

9. The check valve, according to claim 1, wherein said valve body and said poppet are manufactured from dissimilar materials and wherein said movement guiding surface is sized to accommodate thermal expansion of said poppet during operation of said check valve.

10. The check valve, according to claim 1, wherein said frustoconical surface of said poppet is substantially smooth.

11. The check valve, according to claim 1, wherein each of said predetermined plurality of passages is formed through said frustoconical surface in open communication with said peripheral rim.

12. The check valve, according to claim 1, wherein said each of said predetermined plurality of passages has a generally V-shaped cross-section in said direction transverse to said poppet axis.

13. The check valve, according to claim 12, wherein a total cross-sectional area of said predetermined plurality of passages in said direction transverse to said poppet axis is greater than a cross-sectional area of each of said first and second apertures of said valve body.

14. The check valve, according to claim 1, wherein said poppet includes a cavity formed in said opposed axial end of said poppet, wherein said predetermined plurality of passages are disposed in open communication with said cavity, and wherein a side peripheral surface of said cavity tapers inwardly in said direction toward said poppet axis starting at said opposed axial end of said poppet.

15. The check valve, according to claim 1, wherein said valve further includes a second annular valve seat disposed at a juncture of said internal chamber with another one of said first and second ends of said valve body, wherein said poppet includes a second frustoconical surface provided on said opposed axial end of said poppet and oriented in a direction toward said another one of said first and second ends of said valve body, said second frustoconical surface tapering from said peripheral rim in said direction toward said poppet axis, and wherein said poppet further includes a second annular sealing bead disposed on said second frustoconical surface, said second annular sealing bead having an exterior surface thereof raised a distance from said second frustoconical surface, said exterior surface of said second annular sealing bead having said convex shape in said plane having said poppet axis disposed therewithin.

16. The check valve, according to claim 1, wherein an axis of said first aperture and an axis of said second aperture are offset from an axis of said poppet.

17. The check valve, according to claim 1, wherein said valve seat is defined by a chamfer between a generally cylindrical inner surface of said one of said first and second ends and a surface of said internal chamber inclined relative to said generally cylindrical inner surface and wherein said exterior surface of said sealing bead directly abuts said chamfer for sealing said one of said first and second ends.

18. The check valve, according to claim 1, wherein said check valve is configured for exposure to harmful chemicals.

19. The check valve, according to claim 1, wherein said check valve is configured for use in sterile or clean applications wherein a shape of said internal chamber is provided in localized depressions or reservoirs free manner so that a fluid cannot accumulate or otherwise be retained in said internal chamber when the fluid exits said internal chamber through one of said first or second apertures, and wherein a uniform continuous surface portion extends through said one of said first and second apertures and said internal chamber, said uniform continuous surface portion beginning at an exterior end surface of a respective end having said one of said first and second apertures formed therethrough.

20. The check valve, according to claim 1, wherein a juncture between each side edge surface of said sealing bead and said frustoconical surface of said poppet includes an inwardly curved peripheral surface.

21. A check valve comprising:
(a) a valve body manufactured from a first predetermined material and including:
(i) a first hollow portion having each of an outer open end defining a first open end of said valve body, an inner open end axially opposed to said outer end along a flow axis of said valve body, a first annular peripheral flange disposed on said inner end and extending outwardly transverse to said flow axis, said first annular peripheral flange having a substantially smooth surface disposed perpendicular to said flow axis, and a first annular groove formed in said substantially smooth surface,
(ii) a second hollow portion having each of an outer open end defining a second open end of said valve body, an inner open end axially opposed to said outer end of said second portion along said flow axis of said valve body, a second annular peripheral flange disposed on said inner end of said second portion and extending outwardly transverse to said flow axis, said second annular peripheral flange having a substantially smooth surface disposed perpendicular to said flow axis, and a second annular groove formed in said substantially smooth surface of said second portion in alignment with said first annular groove,
(iii) an internal chamber formed by said first hollow portion and said second hollow portion, said internal chamber having a round cross-section in a direction transverse to said flow axis, said internal chamber open at each of said first and second ends of said valve body,
(iv) a resilient seal at least disposed within said pair of aligned annular grooves, and
(v) a clamp abuttingly engaging tapered outer surfaces of said pair of peripheral annular flanges;
(b) a substantially planar annular surface disposed within said internal chamber adjacent to one of said first and second ends of said valve body at a predetermined angle relative to said flow axis thereof, said annular surface having an annular chamfer encasing an inner edge thereof; and
(c) a disk shaped poppet mounted for linear movement within said internal chamber along said flow axis of said valve body between said first and second ends thereof, said disk shaped poppet having a poppet axis thereof normally aligned with said flow axis of said valve body, said disk shaped poppet manufactured from a second predetermined material distinct from said first predetermined material of said valve body, said disk shaped poppet including:
(i) a round cross-sectional shape in a direction transverse to said poppet axis,
(ii) a peripheral annular rim defining a substantially smooth movement guiding surface,
(iii) a cavity formed in one axial end of said disk shaped poppet, said cavity tapering inwardly in a direction toward said poppet axis starting at said one axial end of said poppet,
(iv) a substantially smooth frustoconical surface provided in an opposed axial end of said disk shaped poppet oriented in a direction toward said one end of said valve body, said frustoconical surface tapering from said peripheral rim in a direction toward said poppet axis,
(v) a sealing bead disposed on said frustoconical surface and having a substantially radial surface raised a predetermined distance from said frustoconical surface and abuttingly engaging said annular chamfer of said valve body, and
(vi) a predetermined plurality of passages formed in a predetermined radial pattern through said frustoconical surface in open communication with each of said peripheral rim and said cavity, wherein a total cross-sectional area of said predetermined plurality of passages in said direction transverse to said poppet axis is greater than a cross-sectional area of each of said first and second open ends of said valve body.

22. In combination with a check valve having a poppet mounted for movement within an internal chamber for selectively permitting and preventing fluid flow through an inlet end thereof, a predetermined plurality of passages formed in a predetermined pattern through said poppet in open communication with a peripheral rim thereof, each of said predetermined plurality of passages having a generally V-shaped cross-section in a direction transverse to a poppet axis, wherein a total cross-sectional area of said predetermined plurality of passages in said direction transverse to said poppet axis is greater than a cross-sectional area of each of said inlet end and an outlet end.

23. A check valve comprising:
(a) a valve body having each of an internal chamber, a first aperture formed through a first end of said valve body, and a second aperture formed through an axially opposite second end of said valve body, said internal chamber having a tapered surface;
(b) a valve seat defined by a chamfer between said tapered surface and a surface of one of said first and second ends of said valve body; and
(c) a poppet mounted for linear movement along a poppet axis within said internal chamber between said first and second ends of said valve body, said poppet defining a frustoconical surface provided in one axial end of said poppet and oriented in a direction toward said one of said first and second ends of said valve body and a sealing bead disposed on said frustoconical surface, wherein said sealing bead directly abuts said chamfer for sealing said one of said first and second ends of said valve body, and wherein said check valve is configured to seal said one of said first and second end of said valve body in absence of a bias spring or other type of mechanical actuation, and wherein an axis of said poppet is being offset from an axis of said first aperture and an axis of said second aperture.

24. A check valve comprising:
(a) a valve body having each of an internal chamber, a first aperture formed through a first end of said valve body, and a second aperture formed through an axially opposite second end of said valve body, said valve body including a uniform continuous interior surface portion extending through said one of said first and second apertures and said internal chamber, said uniform continuous surface portion beginning at an exterior end surface of a respective end having said one of said first and second apertures formed therethrough;

(b) a one-piece poppet mounted for a linear movement along a poppet axis within said internal chamber between said first and second ends of said valve body, said poppet defining a frustoconical surface provided in one axial end of said poppet and oriented in a direction toward one end of said valve body and a peripheral sealing bead disposed on said frustoconical surface, and wherein an axis of said poppet is being offset from an axis of said first aperture and an axis of said second aperture;

(c) whereby said internal chamber is provided in localized depressions or reservoir free manner so that a fluid cannot accumulate or otherwise be retained in said internal chamber when the fluid exits said internal chamber through one of said first or second apertures; and (d) wherein said check valve is configured for exposure to harmful chemicals and/or use in sterile or clean applications.

25. A check valve comprising:
(a) a valve body having each of an internal chamber, a first aperture formed through a first end of said valve body, and a second aperture formed through an axially opposite second end of said valve body, said internal chamber having a tapered surface;
(b) a valve seat defined by a chamfer between said tapered surface and a surface of one of said first and second ends of said valve body;
(c) a poppet mounted for a linear movement along a poppet axis within said internal chamber between said first and second ends of said valve body and having said poppet axis thereof being offset from an axis of said first aperture and an axis of said second aperture, said poppet defining a frustoconical surface provided in one axial end of said poppet and oriented in a direction toward said one of said first and second ends of said valve body and a sealing bead disposed on said frustoconical surface and having an exterior convex surface thereof raised a distance from said frustoconical surface of said poppet, wherein said exterior convex surface of said sealing bead directly abuts said chamfer for sealing said one of said first and second ends of said valve body; and
(d) wherein said check valve is configured to seal said one of said first and second end of said valve body in absence of a bias spring or other type of mechanical actuation.

26. A check valve comprising:
(a) a valve body including:
  i. first and second inlet ends spaced apart from each other along an axis of said valve body, each of said inlet ends having an axial aperture formed therethrough,
  ii. an outlet end having an aperture formed therethrough, wherein an axis of said aperture of said outlet end is disposed normal to said axis of said valve body, and
  iii. an internal chamber in open communication with each of said first and second inlet ends and said outlet end;
(b) an annular valve seat disposed at a juncture of said internal chamber with each of said first and second inlet ends of said valve body; and
(c) a first poppet mounted for a linear movement along a poppet axis within said internal chamber between said first and second inlet ends of said valve body, said first poppet including:

(i) a peripheral rim,
(ii) a frustoconical surface provided in one axial end of said first poppet and oriented in a direction toward one of said first and second inlet ends of said valve body, said frustoconical surface tapering from said peripheral rim in a direction toward said poppet axis,
(iii) an annular sealing bead having an exterior surface thereof raised a distance from said frustoconical surface, said exterior surface having a convex shape in a plane having said poppet axis disposed therewithin, said convex shape being defined by an arc disposed tangent to said annular seat and having a radii originating on said poppet axis, and
(iv) passages formed through at least one of said peripheral rim and said frustoconical surface in open communication with an opposed axial end of said first poppet (d) a second poppet mounted for a linear movement along a poppet axis within said internal chamber between said first and second inlet ends of said valve body, said second poppet including:
(i) a peripheral rim,
(ii) a frustoconical surface provided in one axial end of said second poppet and oriented in a direction toward an opposite one of said second and second inlet ends of said valve body, said frustoconical surface of said second poppet tapering from said peripheral rim thereof in said direction toward said poppet axis,
(iii) an annular sealing bead having an exterior surface thereof raised a distance from said frustoconical surface of said second poppet, said exterior surface of said annular sealing bead of said second poppet having said convex shape, and
(iv) passages formed through at least one of said peripheral rim and said frustoconical surface of said second poppet in open communication with an opposite axial end thereof; and (e) an axial stop carried by at least one of said first and second poppets, said axial stop configured to maintain a fixed distance between said first and second poppets so as to prevent intermeshing thereof during operation of said check valve.

27. A check valve comprising:
(a) a valve body having each of an internal chamber, a first aperture formed through a first end of said valve body, and a second aperture formed through an axially opposite second end of said valve body;
(b) a valve seat disposed at a juncture of said internal chamber with one of said first and second ends of said valve body; and
(c) a poppet mounted for a linear movement along a poppet axis within said internal chamber between said first and second ends of said valve body, said poppet including:
(i) a peripheral rim defining a movement guiding surface,
(ii) a frustoconical surface provided in one axial end of said poppet and oriented in a direction toward one end of said valve body, said frustoconical surface tapering from said peripheral rim in a direction toward said poppet axis,
(iii) a sealing bead disposed on said frustoconical surface, and
(iv) a predetermined plurality of passages formed in a predetermined pattern through at least one of said peripheral rim and said frustoconical surface in open communication with an opposed axial end of said poppet, wherein a total cross-sectional area of said predetermined plurality of passages in said direction transverse to said poppet axis is greater than a cross-sectional area of each of said first and second apertures of said valve body.

28. A check valve comprising:
(a) a valve body having each of an internal chamber, a first aperture formed through a first end of said valve body, and a second aperture formed through an axially opposite second end of said valve body;
(b) a valve seat disposed at a juncture of said internal chamber with one of said first and second ends of said valve body; and
(c) a poppet mounted for a linear movement along a poppet axis within said internal chamber between said first and second ends of said valve body, said poppet including:
  (i) a peripheral rim defining a movement guiding surface,
  (ii) a frustoconical surface provided in one axial end of said poppet and oriented in a direction toward one end of said valve body, said frustoconical surface tapering from said peripheral rim in a direction toward said poppet axis,
  (iii) a sealing bead disposed on said frustoconical surface,
  (iv) a predetermined plurality of passages formed in a predetermined pattern through at least one of said peripheral rim and said frustoconical surface in an open communication with an opposite axial end of said poppet, and
  (v) a cavity formed in said opposed axial end of said poppet, wherein said predetermined plurality of passages are disposed in said open communication with said cavity, and wherein a side peripheral surface of said cavity tapers inwardly in said direction toward said poppet axis starting at said opposite axial end of said poppet.

* * * * *